W. A. PRATT.
APPARATUS FOR WELDING.
APPLICATION FILED JAN. 13, 1919.
1,343,277.
Patented June 15, 1920.
2 SHEETS—SHEET 1.
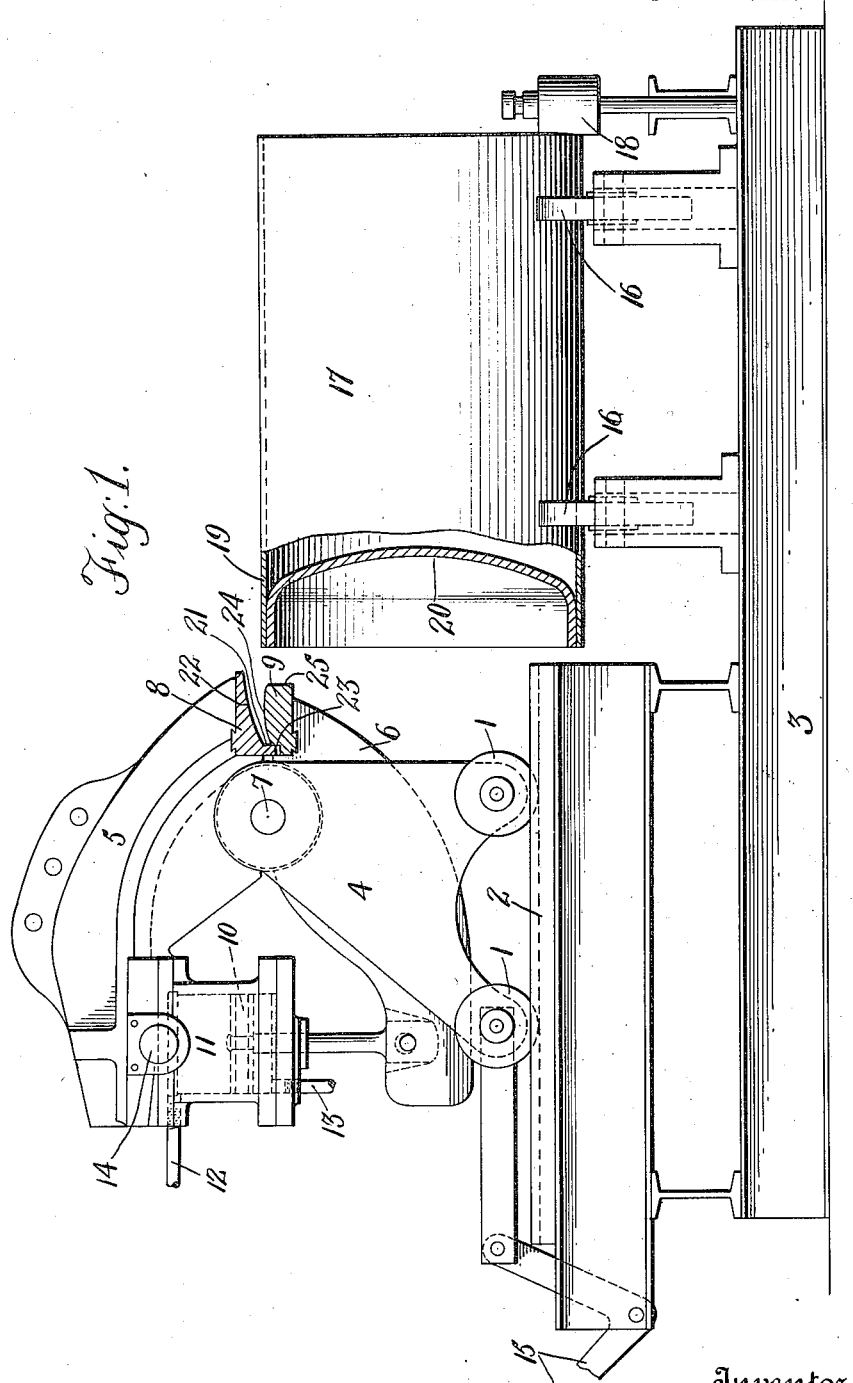
Fig. 1.
Inventor
William A. Pratt
By his Attorneys
Sheffield & Betts

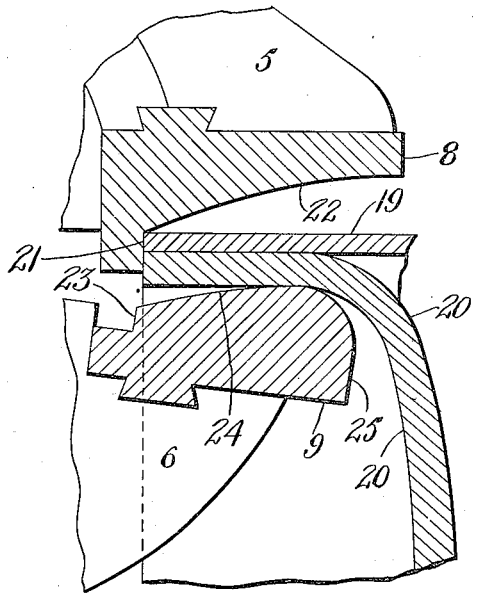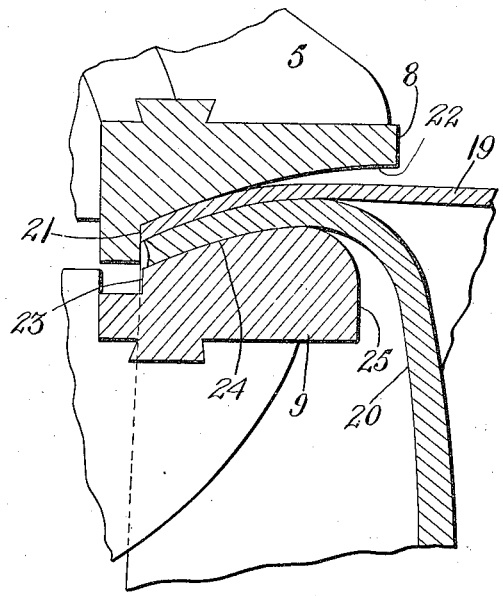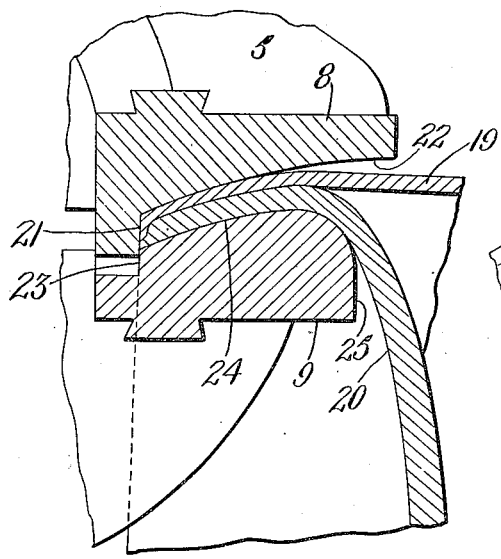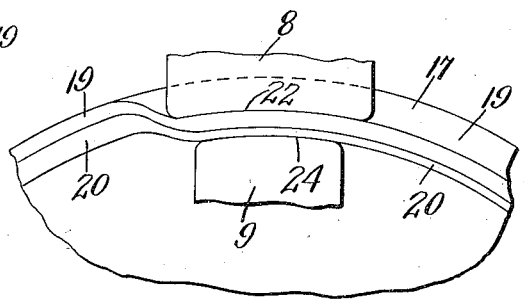

UNITED STATES PATENT OFFICE.

WILLIAM A. PRATT, OF BAYONNE, NEW JERSEY, ASSIGNOR TO THE M. W. KELLOGG COMPANY, OF NEW YORK, N. Y., A CORPORATION OF NEW JERSEY.

APPARATUS FOR WELDING.

1,343,277.  Specification of Letters Patent.  Patented June 15, 1920.

Application filed January 13, 1919. Serial No. 270,995.

*To all whom it may concern:*

Be it known that I, WILLIAM A. PRATT, a citizen of the United States, residing at Bayonne, in the county of Hudson and State of New Jersey, have invented a new and useful Improvement in an Apparatus for Welding, of which the following is a specification.

My invention relates to an apparatus for forming and welding together two contacting layers of metal,—for example, the bottom and shell of a cylinder or tank. The object of my invention is to provide a machine which will secure an even edge and a perfect and, therefore, strong weld.

To accomplish this object, I provide an apparatus or welding machine which is so designed as to cause the edge of one of the layers of metal partially to overlap the edge of the other when the welding operation has been completed. The apparatus provided for this purpose and which constitutes the subject matter of this application is simple and adapted to be easily operated and to accomplish the weld quickly. Particularly, my invention further includes welding or squeezing jaws of a form specifically adapted to carry out the object above set forth. Other objects and advantages of my invention will be apparent to those skilled in the art from reading this specification thereof.

Referring to the drawings,—

Figure 1 is an elevation of my welding machine and includes a tank, the bottom and sides of which are to be welded, certain parts being shown in section.

Fig. 2 is a detail view of the welding jaws, showing their position with relation to the parts to be welded, before pressure has been applied.

Fig. 3 shows the same parts after pressure has been applied and clearly indicates the effect upon the parts to be welded.

Fig. 4 shows the same parts when the operation has been completed and clearly shows how the strong weld is obtained.

Fig. 5 is an end elevation of the cylinder or tank, showing the proportionate size of the welding jaws and the effect of the bending of the parts of the tank in the welding operation.

Throughout the drawings, similar reference characters refer to similar parts.

The preferred form of my machine is mounted on wheels 1, running on tracks 2, resting on the rigid foundation 3. The machine itself comprises a frame, 4, and an upper member, 5, secured thereto. A lower member, 6, is pivotally secured to the frame and upper member, the fulcrum being at 7. Detachably mounted on the upper and lower members are two jaws, 8 and 9, respectively, which are of special shape and pattern for the purpose of accomplishing the desired results. The lower member, 6, and jaw, 9, are actuated by a piston, 10, contained in an air-chamber, 11, having two ports, 12 and 13,— the air-chamber being attached to the upper frame, 5, of my machine by means of a pin, 14. The whole machine is moved along the track, 2, by means of a lever, 15.

On the same foundation is mounted framework for holding the article to be welded in its proper position. This framework comprises, in this specific case, roller saddles with four rollers, 16, arranged to carry a cylinder or tank, 17. It also comprises another roller, 18, which acts as a back stop for the tank. The tank itself consists of an outer cylindrical shell, 19, and a concave bottom member, 20.

In my preferred apparatus, the jaws, 8 and 9, are shaped as follows: The upper jaw, 8, has a flat surface, 21, against which the edges of both shell, 19, and bottom member, 20, of the tank abut when they are first placed between the jaws. This jaw also has a curved surface, 22; the curve is gentle rather than abrupt, leaving the flat surface, 21, at an angle not far from the perpendicular and curving slowly toward the perpendicular so as to present a surface that is concave toward the members to be welded. The lower jaw, 9, also has a flat surface, 23, which, when the jaws are closed (as shown in Fig. 4), partially abuts against the flat surface, 21, of the upper jaw. There is also a curved surface, 24, on the lower jaw, the first part of which has substantially the same radius of curvature as the surface, 22; it presents, however, a convex surface toward the members to be welded. The outer part of the surface, 24, is comparatively sharply curved, ending finally in a surface, 25, that is parallel to the surfaces, 21 and 23.

In the operation of my machine, the machine itself is first moved back on the track by depression of the lever, 15, in order to give room for the placing and heating of the article to be welded. Compressed air is introduced into the cylinder, 11, through the port, 13, thereby raising the piston, 10, lowering the jaw, 9, and increasing the space between the jaws, 8 and 9. The cylinder or tank is then placed on the rollers, 16, and against the roller, 18, the rollers being so arranged that the portion of the tank to be welded will be horizontally opposite the space between the two jaws, 8 and 9. This portion of the tank is then brought to a welding heat by any suitable means (for example, by means of a portable gas furnace). After this has been accomplished, the machine is pushed along the tracks, 2, toward the tank, 17, by raising the lever, 15, until the tank and jaws assume the position shown in Fig. 2.

The pressure in the lower part of the air-cylinder, 11, is then released and compressed air is introduced into the port, 12, forcing down the piston, 10, turning the lower member, 6, of the machine on its fulcrum, 7, and raising the jaw, 9. The jaws are so designed and positioned that as the lower one rises, it slightly lifts the end of the tank, at the same time bending both shell, 19, and the bottom, 20, of the tank. In view of the fact that the shell is held against longitudinal motion by the roller, 18, the result of this combined lifting and bending is to slide the bottom of the tank an appreciable distance into the shell, at the same time cupping the edge, as is clearly shown in Fig. 3. The curvature in the shell and bottom of the tank resulting from this operation prevents any further relative motion between the jaws and the parts of the tank. Henceforth, the result of the coming together of the jaws is to pull the edge of the shell partly over the edge of the bottom of the tank, in the manner clearly shown in Fig. 4. Fig. 5 also shows this effect, the left side of the drawing showing the proportionate widths of shell and tank-bottom before welding and the right side showing their proportionate widths after welding.

Although I have described only one form of apparatus for accomplishing the desired result, I am aware that various modifications in detail and in the arrangement and combination of parts of my apparatus may be made by those skilled in the art, without departure from my invention, and I desire protection for all modifications of my apparatus that come within the scope of my invention, as defined in the appended claims.

What I claim is:

1. A machine for welding two contacting layers of metal, comprising in combination two welding jaws, means for separating said jaws to receive the metal layers and for forcing said welding jaws to approach one another to apply welding pressure thereto, and means for holding one of said layers against motion in a direction away from the space between said jaws, said jaws having means whereby the edge of said one layer that is between said jaws is held stationary and the parts of both layers adjacent the edges between said jaws are bent over one of said jaws while pressed forcibly together.

2. A machine for welding two contacting layers of metal comprising in combination two jaws adapted to receive between them the said layers, one of said jaws having a flat surface adapted to bear against the edges of the said layers and a curved surface which is concave toward the layers, and the other of said jaws having a flat surface complementary to the flat surface on the other jaw and a curved surface which is convex toward the layers.

3. A welding machine comprising in combination a frame, a member secured thereto, a second member pivotally secured thereto, means for moving said second member about its axis, and jaws mounted on said members adapted to receive between them the portions of the article which are to be welded together, the operative surfaces of said jaws being complementally curved.

4. A welding machine comprising in combination a base, a frame mounted thereon in such a way that it may be moved toward or away from the article to be welded, a member secured to said frame, a second member pivotally secured thereto, jaws mounted on said members adapted to receive between them the portions of the article which are to be welded, and means for moving said second member about its axis, thereby forcing the jaw on said second member to approach the other jaw and to exert pressure on the said portions of the article which are between the jaws.

5. A machine for welding two contacting layers of metal comprising in combination a frame, a member secured thereto, a second member pivotally secured thereto, jaws mounted on said members adapted to receive between them the said layers, and means for moving said second member about its axis thereby forcing the jaw on said second member to approach the other jaw and to exert pressure on the parts to be welded, said jaws being so shaped that, as they approach, the said layers are bent transversely and the edge of one is upset so as to overlap the edge of the other.

6. A machine for welding a head in a metal cylinder comprising in combination a pair of jaws having portions of their surfaces complementally curved and inclined at an angle to the axis of the cylinder, and means for forcing the jaws together.

7. A machine for welding a head in a metal cylinder comprising in combination a pair of jaws having portions of their surfaces complementally curved and inclined at an angle to the axis of the cylinder, the one of said jaws for engaging the outer face of the cylinder being slightly concave and the one for engaging the head to force it against the inner face of the cylinder being convex, and means for forcing the jaws together.

8. A machine for welding two contacting layers of metal comprising in combination a pair of jaws whose active surfaces are complemental, means for forcing said jaws together, and means whereby said layers are presented to said jaws with the surfaces of the layers inclined to the active surfaces of the jaws.

9. A machine for welding two contacting layers of metal comprising in combination a pair of jaws having complementally curved active surfaces, means for forcing said jaws together, and means whereby said layers are presented to said jaws with the surfaces of the layers inclined to the active surfaces of the jaws.

10. A machine for welding two contacting layers of metal comprising in combination two welding jaws, a member for holding one of said layers against motion in a direction away from the space between said jaws, the said jaws having surfaces adapted to receive between them that portion of the said layers which is to be welded, said surfaces being so shaped that, as they approach, the edge of the layer held as aforesaid is held stationary, the parts of the layers adjacent the edges are bent over one of said surfaces against the other, thus causing the edge of one layer to recede from the edge of the other, and the projecting edge is forced partly over the other edge.

11. A machine for welding two contacting layers of metal comprising in combination two jaws adapted to receive between them the said layers, one of said jaws having a flat surface adapted to bear against the edges of the said layers and a slightly curved surface which is concave toward the layers, and the other of said jaws having a flat surface complementary to the flat surface on the other jaw and a slightly curved surface which is convex toward the layers.

12. A machine for welding two contacting layers of metal comprising in combination a pair of jaws adapted to receive between them the said layers, one of said jaws having a flat surface against which the edges of the layers abut and a curved surface starting from the said flat surface at a small angle to the perpendicular, curving slowly toward the perpendicular, and presenting a concave surface toward the said layers, and the other of said jaws having a complementary flat surface adapted partially to abut against the first mentioned flat surface when the jaws are closed and a curved surface of substantially the same radius of curvature as that of the first-mentioned jaw, at substantially the same angle to the perpendicular on the flat surfaces, and presenting a convex surface toward the said layers.

13. A machine for welding to a metal cylinder a head which is in contact therewith around a cylindrical band on the inside of said cylinder adjacent one edge thereof, comprising in combination a member for holding the cylinder against motion in a direction away from the space between the welding jaws, an upper jaw having a flat surface which, when the jaws are in operative position, holds the cylinder against the said member and against longitudinal motion and having a curved surface touching the edge of said cylinder and slightly inclined and concave to said cylinder when in its original position, a lower jaw having a flat surface adapted partially to abut against the said flat surface on said upper jaw when the jaws are closed and having a curved surface slightly inclined and convex to that portion of said head that is in contact with said cylinder when said head and cylinder are in their original position, and means for forcing said upper and lower jaws together so as to exert pressure on those portions of said head and cylinder that are between them.

14. A welding machine comprising in combination a frame, a member secured thereto, a second member pivotally secured thereto, jaws mounted on said members adapted to receive between them the portions of the article which are to be welded together, and means for moving said second member about its axis, thereby forcing the jaws to approach one another and to exert pressure on the said portions of the article which are between the jaws.

15. A machine for welding two contacting layers of metal comprising in combination two jaws having surfaces adapted to receive between them those portions of the said layers which are to be welded and means for forcing said jaws to approach one another, the said jaw surfaces being so shaped that, as they approach, the said portions of said layers are bent over one of said surfaces and forced together and that portion of the edge of one of said layers that is between said jaw surfaces is caused to recede from the corresponding portion of the edge of the other.

16. The combination in a welding machine of a frame, members on said frame mounted for relative turning movement, jaws on said members for compressing the parts to be welded, said members also having spaced portions, and relatively movable parts pivoted to said spaced portions for causing the relative movement of said members in the welding operation.

WILLIAM A. PRATT.